Aug. 6, 1957   J. BORSOS   2,801,496
MAGNETIC TOY GLOBE
Filed July 27, 1956

Joseph Borsos
INVENTOR.

United States Patent Office 2,801,496
Patented Aug. 6, 1957

2,801,496
MAGNETIC TOY GLOBE
Joseph Borsos, Allen Park, Mich.
Application July 27, 1956, Serial No. 600,489
5 Claims. (Cl. 46—240)

The present invention generally relates to an amusement device and more particularly to a toy of the magnetic type in which a simulated vehicle is caused to move about the surface of a spherical globe in a manner which appears to defy the law of gravity and in a manner which creates an illusion of great speed.

An object of the present invention is to provide a magnetic toy globe having a magnet mounted in a hollow globe with a magnetically attracted simulated vehicle on the outer surface thereof, so that the vehicle may be caused to move in relation to the surface of a globe in any path desired by manipulating the handles provided on the device.

Another object of the present invention is to provide a magnetic toy globe which is simple in construction, adapted for various manners of utility, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
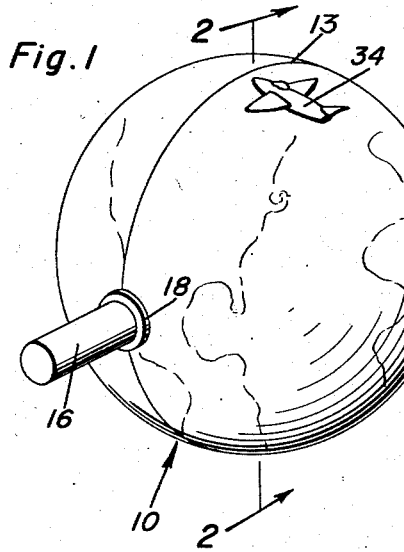
Figure 1 is a perspective view of the magnetic toy globe of the present invention.
Figure 2:
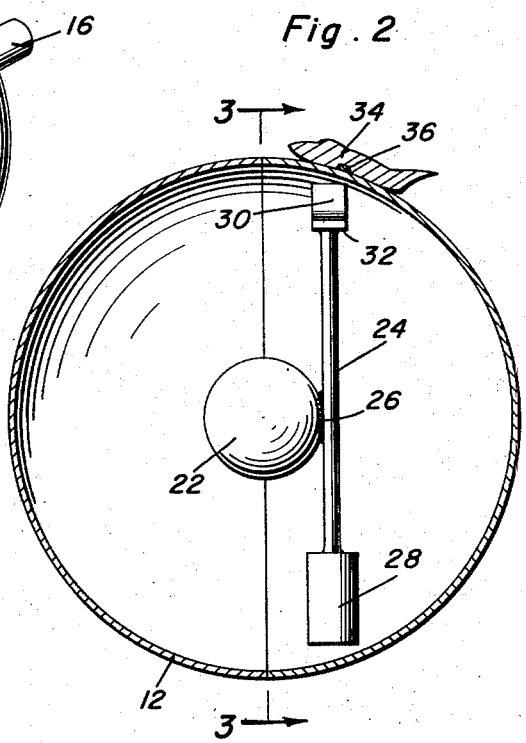
Figure 2 is a vertical sectional view taken substantially upon a plane passing along section line 2—2 of Figure 1.
Figure 3:
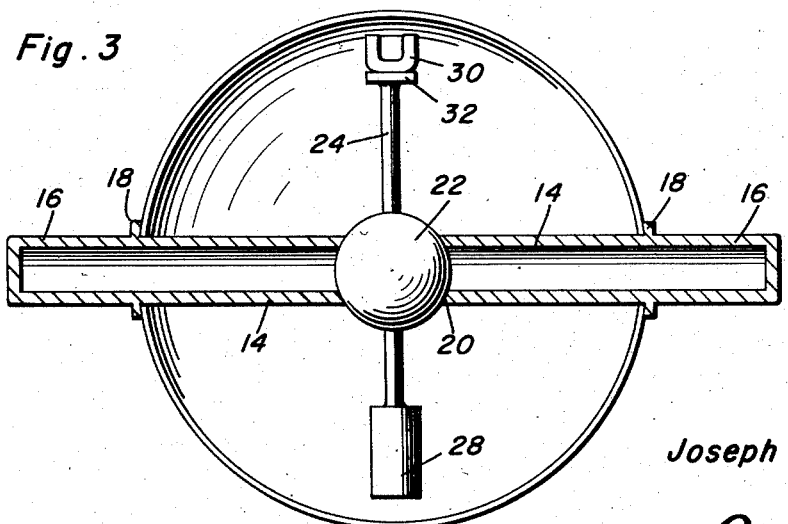
Figure 3 is a detailed sectional view taken substantially upon a plane passing along section line 3—3 of Figure 2.

Referring now specifically to the drawings, the numeral 10 generally designates the magnetic toy globe which constitutes a hollow sphere or globe 12 of suitable material, such as plastic or the like, which may be provided with a separation line 13 dividing the device into two halves for assembly purposes.

Extending transversely of the spherical member 12 is a tubular member 14 having a projecting handle 16 on each end thereof and a projecting peripheral flange 18 at the inner end of each handle 16 for engaging the periphery of the globe 12. The flanges 18 are secured to the globe 12 for rotation of the globe 12 when the handles 16 are rotated. The tubular member 14 is separated into two sections and terminates adjacent the center of the sphere 12 in spherical seat portions 20 for movably receiving a spherical ball member 22, so that the ball member 22 may rotate or move in angular relation to the tubular member 14.

Secured to the ball 22 at its tangent is a transverse cross rod 24 which is attached by suitable securing means, such as adhesive or the like 26. The lower end of the rod 24 is provided with a counter-balance weight 28 and the upper end of the rod 24 is provided with a U-shaped magnet 30 having a supporting platform 32. A simulated airplane or other vehicle 34 is mounted on the periphery of the sphere 12 and may be constructed of magnetic material or of plastic material having a magnetic insert, such as the insert 36 of metal which is susceptible to magnetic influence therein, so that the magnetic attraction between the magnet 30 and the magnetic insert 36 will retain the simulated airplane 34 on the periphery of the globe 12.

By grasping the handles 16, the globe 12 may be caused to rotate and the counter-balancing weight 28 will retain the rod 24 in a predetermined angular position so that the movable vehicle or airplane 34 will be retained in a stationary position while the surface of the globe 12 moves thereunder, thereby giving the illusion of forward movement to the vehicle 34. By tilting the axis of rotation of the globe 12, which is coincidental with the axis of the tubular member 14, the path of movement of the airplane 34 is about the surface of the globe 12 may be altered as desired. The spherical seat portion 20 on the inner ends of the tubular sections of the tubular member 14 form a bearing for the ball 22, so that the weight 28 will maintain the rod 24 in substantially vertical position at all times.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A toy comprising a hollow globe, a pair of inwardly extending members disposed in alignment and terminating in spaced seat portions, a ball rotatably supported in said seat portions, an elongated rod rigidly attached to said ball, a weight on one end of said rod, a magnet on the other end of the rod, said magnet being disposed adjacent the inner surface of the globe, handle means for rotating said globe, and a movable object disposed on the outer surface of the globe, said object being provided with a piece of metal susceptible to magnetic influence whereby the magnet will retain the object on the globe, said weight retaining the magnet in substantially constant position during rotation of the globe.

2. A toy comprising a hollow globe, a pair of inwardly extending members disposed in alignment and terminating in spaced seat portions, a ball rotatably supported in said seat portions, an elongated rod rigidly attached to said ball, a weight on one end of said rod, a magnet on the other end of the rod, said magnet being disposed adjacent the inner surface of the globe, handle means for rotating said globe, and a movable object disposed on the outer surface of the globe, said object being provided with a piece of metal susceptible to magnetic influence whereby the magnet will retain the object on the globe, said weight retaining the magnet in substantially constant position during rotation of the globe, said rod being mounted tangentially on said ball, said weight being disposed adjacent the inner surface of the globe for counterbalancing said magnet.

3. A toy comprising a hollow globe, a pair of inwardly extending members disposed in alignment and terminating in spaced seat portions, a ball rotatably supported in said seat portions, an elongated rod rigidly attached to said ball, a weight on one end of said rod, a magnet on the other end of the rod, said magnet being disposed adjacent the inner surface of the globe, handle means for rotating said globe, and a movable object disposed on the outer surface of the globe, said object being provided with a piece of metal susceptible to magnetic influence whereby the magnet will retain the object on the globe, said weight retaining the magnet in substantially constant position during rotation of the globe, said inwardly extending members being hollow with the outer ends thereof projecting outwardly of the globe and forming the handle means, said members being rigidly attached to said globe.

4. A toy comprising a hollow globe, a pair of inwardly extending members disposed in alignment and terminating in spaced seat portions, a ball rotatably supported in said seat portions, an elongated rod rigidly attached to said ball, a weight on one end of said rod, a magnet on the other end of the rod, said magnet being disposed adjacent the inner surface of the globe, handle means for rotating said globe, and a movable object disposed on the outer surface of the globe, said object being provided with a piece of metal susceptible to magnetic influence whereby the magnet will retain the object on the globe, said weight retaining the magnet in substantially constant position during rotation of the globe, said object being in the form of a miniature vehicle whereby the path of movement of the vehicle on the globe may be altered by tilting the axis of rotation of the globe.

5. The combination of claim 4 wherein said globe and vehicle are constructed of plastic, said vehicle having a metallic insert susceptible to magnetic influence.

References Cited in the file of this patent

UNITED STATES PATENTS

| 794,466 | Robinson | July 11, 1905 |
| 1,070,546 | Sherlock et al. | Aug. 19, 1913 |

FOREIGN PATENTS

| 3,727 | Great Britain | 1897 |